No. 778,110. PATENTED DEC. 20, 1904.
H. CANNON.
MEANS FOR FACILITATING THE STUDY OF LANGUAGES.
APPLICATION FILED DEC. 16, 1903.
NO MODEL. 2 SHEETS—SHEET 1.
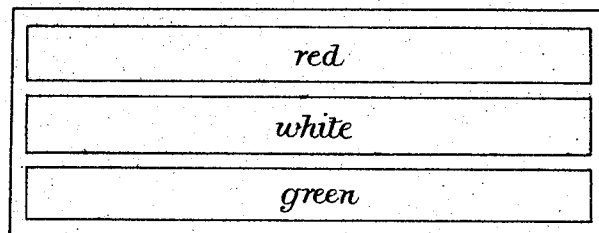
Fig. 1.
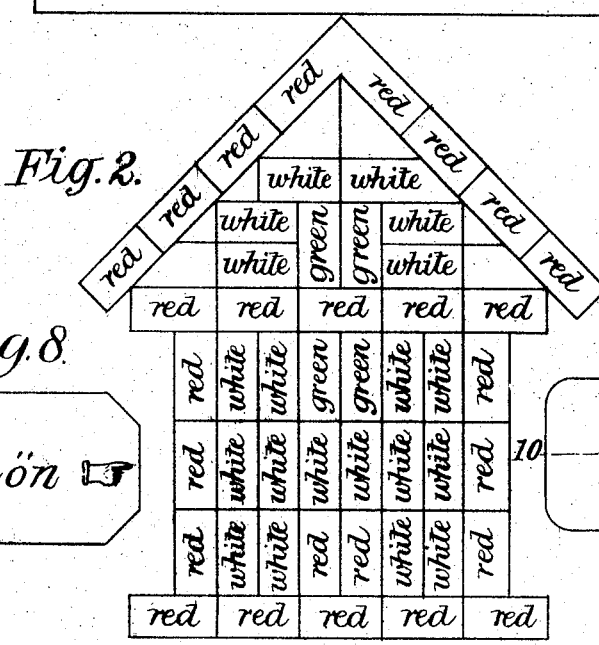
Fig. 2.
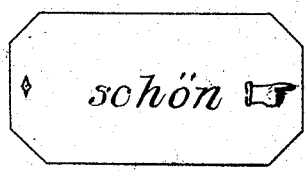
Fig. 8.
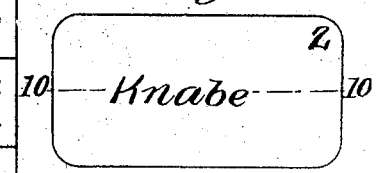
Fig. 9.
Fig. 10.
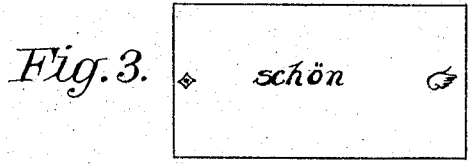
Fig. 3.
Fig. 4.
| Nominative | Genitive | Verb or Auxiliary | Dative | Accusative | Verb or Participle | |
|---|---|---|---|---|---|---|
| der | des | | dem | den | | Red |
| die | der | | der | die | | White |
| das | des | | dem | das | | Green |
Witnesses:
Stephen Kinsta.
Adelaide B. Stelle.
Inventor:
Horace Cannon
By Wilkinson & Fisher
his Attorneys.

No. 778,110. PATENTED DEC. 20, 1904.
H. CANNON.
MEANS FOR FACILITATING THE STUDY OF LANGUAGES.
APPLICATION FILED DEC. 16, 1903.
NO MODEL. 2 SHEETS—SHEET 2.

No. 778,110. Patented December 20, 1904.

UNITED STATES PATENT OFFICE.

HORACE CANNON, OF LONDON, ENGLAND.

MEANS FOR FACILITATING THE STUDY OF LANGUAGES.

SPECIFICATION forming part of Letters Patent No. 778,110, dated December 20, 1904.

Application filed December 16, 1903. Serial No. 185,423.

*To all whom it may concern:*

Be it known that I, HORACE CANNON, tutor, a subject of the King of Great Britain, residing at 34 Charlotte street, Fitzroy Square, London, England, have invented certain new and useful Improvements in Means for Facilitating the Study of Languages, of which the following is a specification.

This invention relates to educational appliances, more particularly to a new and improved means for facilitating the study of languages by use of a series of cards properly marked in accordance with the scheme hereinafter fully described, properly combined with a series of tables.

The means as herein disclosed are designed to improve on those disclosed by my British Patent No. 3,930, of February 22, 1893, wherein is described a series of cards plain on one side and colored red or green or left white on the other, having a foreign (as German) noun on each side, together with a translation thereof on the plain side.

In the accompanying drawings, Figure 1 shows a sheet or card marked with three rows or bands, colored, respectively, red, white, and green, from top to bottom. Fig. 2 shows any fanciful design (as a house) made from the colored cards, which may be used more successfully with children than the colored rows shown by Fig. 1. Fig. 3 shows an adjective-card provided with a star and an indicator in the form of a pointing hand. Fig. 4 shows a table arranged to facilitate the formation of sentences when cards are placed thereon. Fig. 5 shows a table arranged to determine the proper terminations to give nouns when cards are placed in proper position thereon. Fig. 6 shows a table arranged to determine the proper endings of adjectives when cards are placed in proper position thereon. Fig. 7 shows the two sides of a noun-card of masculine gender, it being understood that this figure shows merely a general example of the plan used, the other noun, verb, and adjective cards following a similar scheme. Figs. 8 and 9 shows cards that may be used for blind people, being provided with raised letters and having their corners cut off in such manner that the different classes of words (adjectives and nouns shown here) may be distinguished by touch alone; and Fig. 10 shows a cross-sectional view on line 10 10 of Fig. 9, showing the raised letters.

The scheme will now be described as applied to the German language being learned by an Englishman or American; but it should be understood that this arrangement is not in any sense limited to the German and English languages alone, it being applicable to any two languages.

In practice the cards are issued in series of about three hundred or four hundred words, including one hundred verbs, until sufficient have been given for any general conversation (about two thousand) and afterward as demand may require. For the German language the nouns will be printed on cards colored on one side according to their gender—*i. e.*, masculine red, feminine white, and neuter green. In vending these sets commercially they will be packed in any suitable box or case and arranged therein alphabetically for convenience of access or in any other convenient manner, as in separate divisions. As the box or case does not form a part of my invention, its construction is immaterial and need not be further described.

As indicated above, the noun-cards are printed in three colors, and the noun is printed in German on these colored sides and in addition thereto a number showing the form of its declension to be used in conjunction with the table shown by Fig. 5. On the plain side the same noun is printed in both German and English, and the phonetic equivalent of the pronounciation is also given when there is any difficulty. The verbs are printed on cards similar to the nouns and may be plain or tinted, having on one side the German verb in the infinitive mood and on the other the same verb and its English equivalent. In the case of irregular verbs on the side with the translation are given the number of irregularities. The adjectives may be printed on either separate cards or a number on the same card, in which case they would be arranged alphabetically. Separate cards are preferably used, and each one is provided with a suitably-placed star and pointer to be used in conjunction with a table of endings to be hereinafter described.

The following is the method of practice: Take as many cards as you think you can learn at a time. On one side of the card is the foreign word only. On the other (the plain side) is the foreign word with the translation. With German, for example, place these in three rows, the red at the top, the green at the bottom, and the white in the middle, as indicated by Fig. 1. Then repeat "der" before every word on the red cards, as "der Knabe," (the boy;) "die" before every word on the white cards, as "die Feder," (the pen;) and "das" before every word on the green cards, as "das Wasser," (the water,) and after a little practice it will be generally easy to make some analogy with the noun and the color. When that has been repeated two or three times, turn the cards over and learn the English translation and repeat the articles with the German word, as "der Knabe," (the boy,) "die Feder," (the pen,) "das Wasser," (the water.) Then when you think you know them, still having the white side upward, mix them together, with the plain side still uppermost, and afterward try to put them in their proper rows by color without turning them over to see if correct, "der" to the left, "das" to the right, and "die" in the middle. When you have thus laid out in rows all the cards you are going to learn, turn each row over, and you will see instantly by their colors if you have learned them thoroughly, and the very fact that one of the cards has got into the wrong row will so impress it upon your memory that you will not make the same mistake if you do it over again.

Another method, more especially to be used by young children, is shown by Fig. 2, where the cards are used as blocks to build a house, with the three colors represented in its construction. A sketch, as shown by the figure, is to be covered with the noun-cards, but with the white side upward and not turned over until the whole sketch is covered with the cards, when mistakes are readily noted.

When the student has sufficient knowledge of the nouns and some verbs, he should endeavor to form sentences by placing the cards on the table. (Shown by Fig. 4.)

Place the card "Vater" on the first space, "Knabe" on the second, then the verb "haben" on the verb-space, then "Hund" on the dative space, and "Fleisch" on the accusative space and the verb "geben" on the last verb-space. This the student will read as "Der Vater des Knaben hat dem Hund das Fleisch gegeben," or the teacher places a noun-card on the column, then a verb or auxiliary, then the noun-card either in the dative or accusative, or both, as the sentence may require, then the verb. He then asks the pupil to repeat the article belonging to each noun in its proper case and to conjugate the verb to suit the sentence.

The table shown by Fig. 5 enables the student to determine the variation of the nouns, the terminations being so arranged that by placing a noun-card in its corresponding color and number on the table the proper case ending is seen either in the singular or plural—as, for example, "Knabe" will be found to have the numeral "2," indicating the number of the form of its declension, in the corner. By placing the card on the second division of the portion of the table marked "red" opposite will be found the ending for all the cases, singular and plural.

The table shown by Fig. 6 gives the endings of the adjectives, so that if an adjective-card be placed on the place of the article of the same color as the noun you wish to qualify and the star on the adjective-card opposite the proper case the indicator will point to the proper ending of the adjective.

If a noun has an irregularity not shown on the table of Fig. 5, it will be indicated on the card itself or by a special table.

It will be readily seen that by merely printing the words in raised letters and by making the cards of different shapes instead of colors this system of teaching may be used for the blind. For instance, on reference to Figs. 8 and 9 an adjective and a noun card are shown distinguishable by the configuration of their corners, which illustrates one way in which the various classes of words may be distinguished by the sense of touch alone.

Obviously the system herein described can be greatly modified to suit various conditions.

Therefore, without limiting the invention to the exact exemplification shown and described nor enumerating equivalents, I claim, and desire to secure by Letters Patent, the following:

1. The combination of means for use in teaching languages, comprising a plurality of cards bearing a word of a language, the translation thereof and means for designating the form of its declension, substantially as described.

2. The combination of means for use in teaching languages, comprising a plurality of cards bearing a word of a language on one side, the translation thereof on the other, and a number for designating the form of its declension, substantially as described.

3. The combination of means for use in teaching languages, comprising a plurality of cards having plain and tinted sides, bearing a word of a language on one side, the translation thereof on the other and means for designating the form of its declension on the tinted side, substantially as described.

4. The combination of means for use in teaching languages, comprising a plurality of cards bearing a noun of a language, and means for determining the variations of said nouns, substantially as described.

5. The combination with means for use in teaching languages, comprising a plurality of cards bearing a noun of a language, and a table of case endings for each declension, on which said card is placed to determine the proper ending for the noun thereon, substantially as described.

6. The combination of means for use in teaching languages, comprising a plurality of cards bearing a noun of a language and means for designating the form of its declension, and a table of case endings for each declension on which said card is placed to determine the proper ending for the noun thereon, substantially as described.

7. The combination of means for use in teaching languages, comprising a plurality of cards bearing a noun of a language on one side and the translation thereof on the other, and a table of case endings for each declension on which said card is placed to determine the proper ending for the noun thereon, substantially as described.

8. The combination of means for use in teaching languages, comprising a plurality of cards bearing a noun of a language and means for designating the form of its declension on one side and the translation thereof on the other, and means for determining the variations of said nouns, substantially as described.

9. The combination of means for use in teaching languages, comprising a plurality of cards bearing a noun of a language, and means for designating the form of its declension on one side and the translation thereof on the other, and a table of case endings for each declension on which said card is placed to determine the proper ending for the noun thereon, substantially as described.

10. The combination of means for use in teaching languages, comprising a plurality of cards bearing a noun of a language, and a table of case endings for each declension arranged in three sections for masculine, feminine and neuter nouns, on which said card is placed to determine the proper ending for the noun thereon, substantially as described.

11. The combination of means for use in teaching languages, comprising a plurality of cards bearing a noun of a language and a table of endings for each declension for all cases and gender, both singular and plural, on which said card is placed to determine the proper ending for the noun thereon, substantially as described.

12. The combination of means for use in teaching languages, comprising a plurality of cards having plain and tinted sides, bearing a noun of a language and means for determining the form of its declension on the tinted side and the translation thereof on the other, and a table of endings for each declension for all cases and gender, both singular and plural, on which said card is placed to determine the proper ending for the noun thereon, substantially as described.

13. The combination of means for use in teaching languages, comprising a plurality of cards bearing an adjective of a language, and means for determining the case endings thereof, substantially as described.

14. The combination of means for use in teaching languages, comprising a plurality of cards bearing an adjective of a language, and means for determining the case endings thereof with both definite and indefinite article, substantially as described.

15. The combination of means for use in teaching languages, comprising a plurality of cards bearing an adjective of a language, and a table of case endings with definite and indefinite article, for all genders on which said card is placed to determine the proper ending for the adjective thereon, substantially as described.

16. The combination of means for use in teaching languages, comprising a plurality of cards bearing an adjective of a language and a table of case endings with definite, indefinite and no article on which said card is placed to determine the proper ending for the adjective thereon, substantially as described.

17. The combination of means for use in teaching languages, comprising a plurality of cards bearing an adjective of a language and a table of case endings with definite, indefinite and no article for all genders on which said card is placed to determine the proper ending for the adjective thereon, substantially as described.

18. The combination of means for use in teaching languages, comprising a plurality of cards bearing an adjective of a language on one side and the translation thereof on the other, and a table of case endings with definite, indefinite and no article for all genders on which said card is placed to determine the proper ending for the adjective thereon, substantially as described.

19. The combination of means for use in teaching languages, comprising a plurality of cards having a word of a language, and means for forming the words thereon into sentences, substantially as described.

20. The combination of means for use in teaching languages, comprising a plurality of cards bearing a word of a language, and a table provided with articles properly arranged under their respective cases and also provided with verb-spaces on which said cards may be placed to form the words thereon into sentences, substantially as described.

21. The combination of means for use in teaching languages, comprising a plurality of cards bearing a word of a language, and a table provided with articles for all genders properly arranged under their respective cases and also provided with verb-spaces on which said cards are placed to form the words thereon into sentences, substantially as described.

22. The combination of means for use in teaching languages, comprising a plurality of cards bearing a word of a language and suitably tinted to designate the gender thereof, and a table provided with articles properly arranged under their respective cases and also provided with verb-spaces on which said cards may be placed to form the words thereon into sentences, substantially as described.

23. The combination of means for use in teaching languages, comprising a plurality of cards bearing a word of a language and suitably tinted to designate the gender thereof, a table suitably arranged for all cases of nouns and for verbs, and articles properly arranged under their respective cases, with relation to their gender on which said cards may be placed to form the words thereon into sentences, substantially as described.

24. The combination of means for use in teaching languages, comprising a plurality of cards bearing a word of a language, means for determining the variations of the nouns, and means for determining the case endings of the adjectives, substantially as described.

25. The combination of means for use in teaching languages, comprising a plurality of cards bearing a word of a language on one side and the translation thereof on the other, means for determining the variations of the nouns, and means for determining the case endings of the adjectives, substantially as described.

26. The combination of means for use in teaching languages, comprising a plurality of cards having plain and tinted sides, bearing a word of a language and also the translation thereof, means for determining the variations of the nouns, and means for determining the case endings of the adjectives, substantially as described.

27. The combination of means for use in teaching languages, comprising a plurality of cards bearing a word of a language, a table of case endings for each declension of the nouns, and a table of case endings with definite, indefinite and no articles for the adjectives, on which said cards are placed to determine the proper ending for the word thereon, substantially as described.

28. The combination of means for use in teaching languages, comprising a plurality of cards bearing a word of a language, a table of case endings for each declension of the nouns, and a table of case endings with definite, indefinite and no articles for the adjectives and for all genders in both tables, on which said cards are placed to determine the proper ending for the word thereon, substantially as described.

In witness whereof I have hereunto set my hand in presence of two witnesses.

HORACE CANNON.

Witnesses:
H. D. JAMESON,
A. NUTTING.